United States Patent
Morelock

[11] Patent Number: 6,019,386
[45] Date of Patent: Feb. 1, 2000

[54] PROTECTIVE COVER FOR A TRAILER HITCH

[76] Inventor: Garrett Morelock, 4197 Orchard Hill, Bloomfield Hills, Mich. 48304

[21] Appl. No.: 08/848,800

[22] Filed: May 1, 1997

[51] Int. Cl.[7] .................................................. B60D 1/01
[52] U.S. Cl. .......................... 280/507; 280/422; 280/420
[58] Field of Search .................................. 280/507, 422, 280/420; 439/135, 136, 142, 149, 521

[56] References Cited

U.S. PATENT DOCUMENTS

| | | | |
|---|---|---|---|
| 3,577,115 | 5/1971 | Whitright | 339/36 |
| 3,613,044 | 10/1971 | Rarick | 339/44 R |
| 3,782,761 | 1/1974 | Cardin, Sr. | 280/507 |
| 4,738,641 | 4/1988 | Eversole, Jr. | 439/528 |
| 4,772,220 | 9/1988 | Hallier, Jr. | 439/528 |
| 4,800,471 | 1/1989 | Lippert | 362/80 |
| 5,288,094 | 2/1994 | Putnam | 280/420 |
| 5,407,219 | 4/1995 | Chiu | 280/422 |
| 5,603,178 | 2/1997 | Morrison | 40/591 |
| 5,800,188 | 9/1998 | Barber et al. | 439/142 |

FOREIGN PATENT DOCUMENTS

| | | |
|---|---|---|
| 1330435 | 9/1973 | United Kingdom . |
| 2176759 | 1/1987 | United Kingdom . |

OTHER PUBLICATIONS

Overton's® Discount Boating Accessories '97–#3 (two pages) Second page, page 150.

Primary Examiner—Mark T. Le
Assistant Examiner—Daniel Yeagley
Attorney, Agent, or Firm—Gifford, Krass, Groh, Sprinkle, Anderson & Citkowski, PC

[57] ABSTRACT

A protective cover for use in conjunction with a receiver hitch on a vehicle for towing a trailer. The protective cover includes a housing having a flexible frame and a jacket coupled to the frame by a living hinge. The flexible frame is formed to surround the receiver hitch and the jacket closes about the opening of the hitch. A locking mechanism is provided on the jacket opposite the living hinge to lock the jacket to the flexible frame about the receiving hitch. The flexible frame also includes a seat for supporting an electrical component such as a flat plug for supplying a light system to the trailer. The flat plug is removably placed within the seat and is covered by the jacket when the jacket is in a closed position. The jacket is also provided with an interior frame and an exterior frame for aiding in clamping the jacket around the opening of the receiver hitch. The interior frame of the jacket has an outer perimeter equal to or smaller than the interior perimeter of the receiver hitch. The exterior frame of the jacket has an interior perimeter equal to or greater than the outer perimeter of the receiver hitch. The jacket is also provided with a flat surface for placing advertisements, logos, or safety signs. The protective cover is removably seated around a receiving hitch and is readily opened and closed by unlocking and locking the jacket. When opened, the protective cover is still removably fixed to the hitch and becomes part of the receiving hitch.

18 Claims, 2 Drawing Sheets

PROTECTIVE COVER FOR A TRAILER HITCH

BACKGROUND OF THE INVENTION

I. Field of the Invention

The present invention is directed to a protective cover for a trailer hitch. More particularly, the present invention is directed to a protective cover for trailer hitches having a female part affixed to a vehicle for receiving a male part correspondingly fixed to a trailer.

II. Description of the Related Art

Typically, heavy duty trailer hitches provided on vehicles are of a ball joint type or a female receiver hitch affixed to the rear bumper of a vehicle. A disadvantage of both the ball joint and receiver hitch is that they have a tendency to rust due to environmental affects.

More particularly, a disadvantage of a receiver hitch is that it is open to the environment and, therefore, has a tendency to rust within the interior of the receiving passage provided at one end of the receiving hitch. This passageway also has a tendency to collect mud and dust from vehicle travel over roadways. Thus, it is only a short period of time before the passageway and the entire receiving hitch become rusted and dirty. Moreover, a build-up of dirt within the receiving passage may impair proper placement of the tongue of the trailer hitch tongue within the receiving hitch.

A still further disadvantage of ball joint and receiving hitches is that the electrical connection provided for supplying a light system to the trailer is not readily available to the user nor conveniently placed. Generally, the electrical component, such as a flat plug is usually tied up underneath the vehicle in an inconvenient space that requires the user to lie flat on his back to retrieve the flat plug for connection with the trailer hitch.

Covers have been provided for insertion into the receiving hitch or protection of a ball joint to prevent rusting and improve outward appearances. A disadvantage of these previously known covers provided for receiving hitches is that once the user removes the cover there is no designated storage area for the cover when not in use. The user is generally required to simply toss the cover in the trunk of the vehicle when the cover is not in use. These covers, obviously, have a tendency to get lost.

Additionally, receiver hitch covers have been provided with a light that extends about the receiver hitch and acts as a third brake light for extra safety. Like the previously known tube covers, there is no designated storage area for these brake light receiver covers when not in use.

In addition to not being permanently fixed to the receiver hitch, these previously known receiver tube covers do not provide support or storage for electrical connections such as a holder for a cable or a flat plug.

The present invention is directed to a protective cover for use in conjunction with the receiver hitch that is removably fixed to the hitch itself. The present invention provides a cover that may be locked about the hitch and then readily opened for receiving the tongue of a trailer while still engaged with the receiving hitch. The present invention, therefore, provides a receiving hitch cover that prevents dirt and rust from collecting within the passageway and around the hitch when not in use. When not in use, the protective cover, while still attached to the receiving hitch, may be opened to provide access to the passageway of the receiving hitch.

An additional advantage of the protective cover of the present invention is that a housing is provided for securing and storing electrical connections such as a cable or a flat plug within the area of the receiving hitch. While securing the electrical connection to the protective cover of the receiving hitch, the user can readily access the flat plug or cable for connection of the trailer hitch lights. Additionally, securing the electrical connection to the receiving hitch area provides storage and prevents wear and tear of the flat plug or cable and potential wiring shortage due to such wear because of the tendency of the flat plug or cable to drag from the underbody of the vehicle along the road.

SUMMARY OF THE INVENTION

The present invention provides a protective covering for use in conjunction with a receiver hitch on a vehicle for towing a trailer. The protective cover is preferably used on a vehicle having a flat plug or cable for supporting a light system to the trailer.

The protective covering of the present invention includes a solitary housing having an annular frame in the form of a sheath extending around the receiver hitch. The housing also includes a jacket coupled to the frame preferably by a living hinge or other locking hinge. At the opposite end of the living hinge, a locking mechanism such as a latch or clasp is provided to secure the jacket to the frame about the receiver hitch.

An additional housing extends from the annular frame of the protective covering for receiving and supporting a flat plug or cable provided for supplying a light system to a trailer.

The jacket of the housing is preferably flat on the outside and provides space for placing indicia, advertisement, or the like. The interior of the housing is preferably provided with an interior and exterior frame. The interior frame is intended to fit within the interior of the receiver hitch while the exterior frame is intended to fit about the exterior of the receiver hitch. The exterior frame forms the sides of the cover.

The protective covering is preferably formed of a resilient, yet pliable, material for placement about the receiver hitch. The annular frame of the housing is stretched to fit around the exterior of the receiver hitch and has a living hinge connecting the jacket at one end and a second housing for supporting a flat plug at another. Once the annular frame is in place, the flat plug may be placed within this second housing. The jacket may then be closed and locked in place when the hitch is not being used. When the jacket is closed, both the receiving hitch and the flat plug are covered and protected from the elements.

To access the receiver hitch, the jacket is simply unlocked and opened. Since the jacket is attached to the annular frame by a living hinge, the jacket will simply stay in place in an open position when not in use. Moreover, since the annular frame with jacket is placed about the receiver hitch, the protective covering does not need to be completely removed from the receiver hitch and will not get lost.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT

Figure 1:
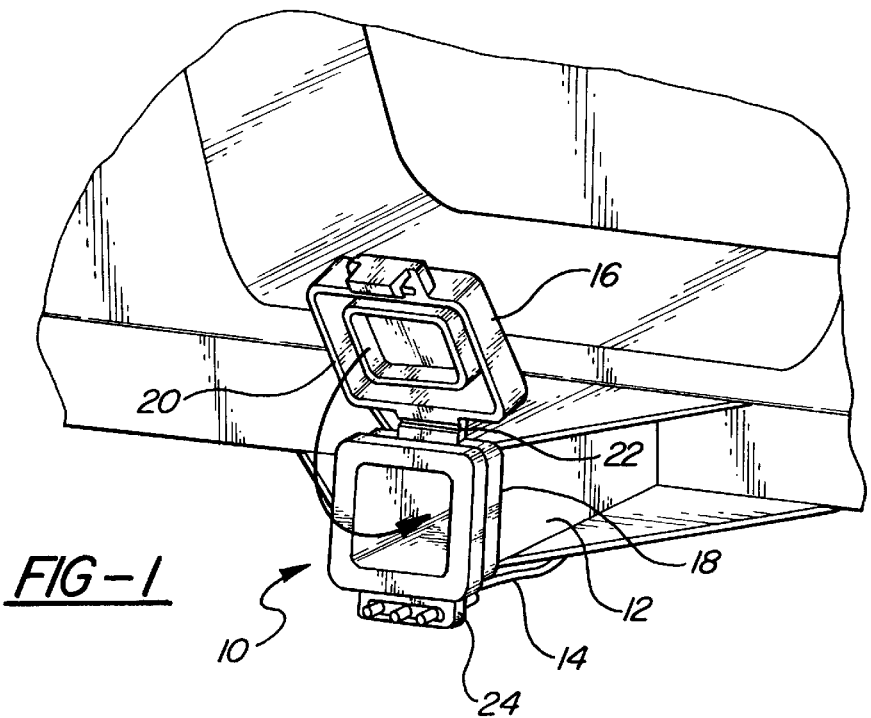
FIG. 1 is a perspective view of a protective covering in accordance with the present invention.
Figure 2:
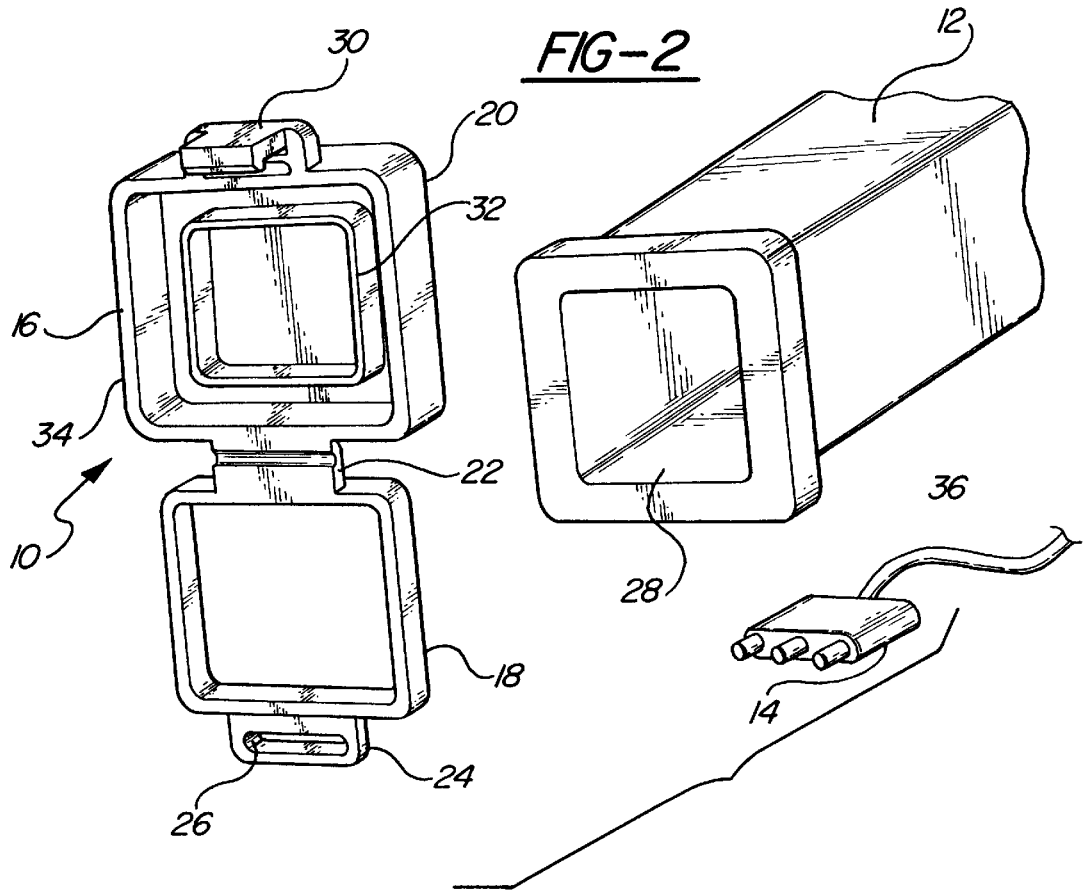
FIG. 2 is a perspective view showing the protective covering prior to adaption to the receiver hitch and flat plug.

Referring to FIGS. 1 and 2, a protective cover 10 for use in conjunction with a receiver hitch 12 and an electrical component such as a flat plug 14 is thereshown.

Protective cover 10 is generally formed of a housing 16 that includes a removable flexible frame 18 and a jacket 20.

Jacket 20 is coupled to flexible frame 18 preferably by a living hinge 22. Flexible frame 18 also provides additional housing 24 for supporting a flat plug 14 within a seat 26.

Jacket 20 is intended to fit over the open end 28 of receiver hitch 12 and lock in place around housing 24 by a latch 30. Jacket 20 is also provided with an interior frame 32 and an exterior frame 34 for closing about open end 28 of receiver hitch 12.

Figure 3:
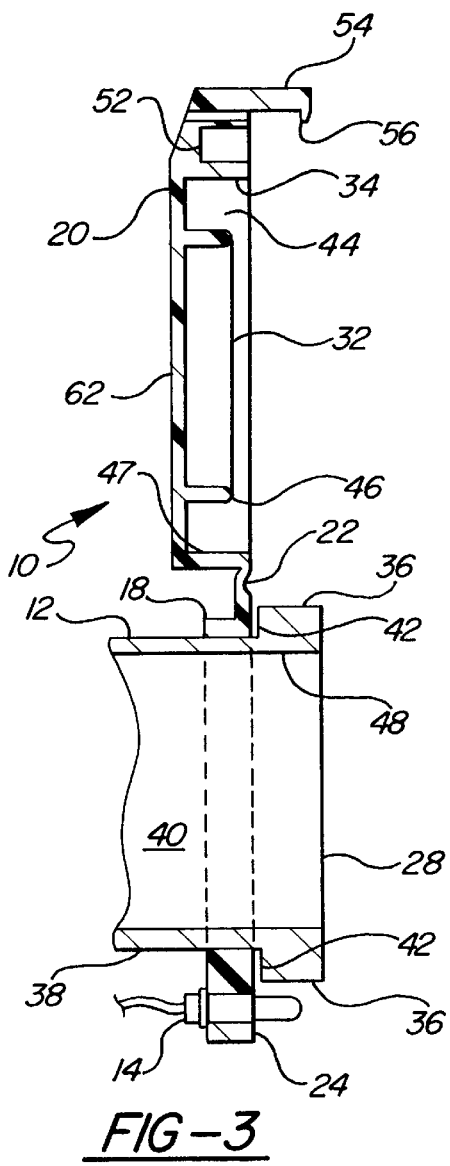
FIG. 3 is a cut-away side elevational view of a protective cover in an open position in accordance with the present invention.
Figure 4:
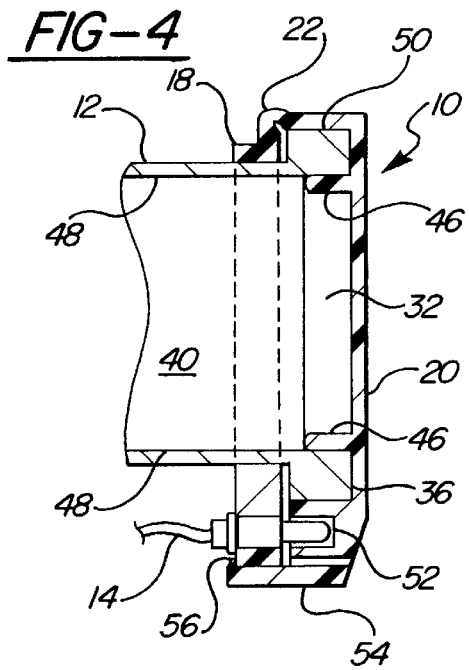
FIG. 4 is a cut-away side elevational view of a protective cover in a closed position in accordance with the present invention.
Figure 5:
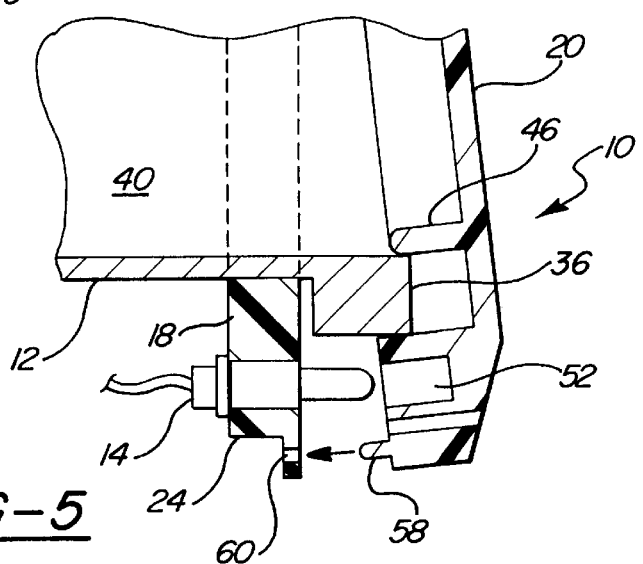
FIG. 5 is a partially cut-away side elevational view of a second preferred embodiment of the locking mechanism employed by the protective cover in accordance with the present invention.

With reference now to FIGS. 3–5, protective cover 10 is thereshown in place about receiver hitch 12. A shown in FIG. 3, protective cover 10 is in an open position allowing access to open end 28 of receiver hitch 12. Flexible frame 18 is extended around flange 36 and outer perimeter 38 of passageway 40 of receiver hitch 12. Flexible frame 18 is preferably positioned against the interior lip 42 of flange 36.

Housing 24 extends from the flexible frame 18 opposite living hinge 22 and beyond flange 36 of the receiver hitch 12. Flat plug 14 is placed within seat 26 of housing 24. Flat plug 14 is removably seated within housing 24 and readily accessible to a user because of its location below flange 36 of receiver hitch 12.

Jacket 20, as shown in FIG. 3, is in an open position and rotated upwardly about living hinge 22. Interior frame 32 extends annularly within the interior 44 of jacket 20. As shown in conjunction with FIG. 4, interior frame 32 preferably has a perimeter 46 that is equal to or less than the perimeter 48 of passsageway 40 of receiver hitch 12.

Exterior frame 34 of jacket 20 also extends annularly about the interior 44 of jacket 20. Exterior frame 34 preferably has a perimeter 47 that is equal to or greater than the perimeter 50 of flange 36 of receiver hitch 12. By providing interior frame 32 and exterior frame 34 within jacket 20, the protective cover 10 is sealed about receiver hitch 12.

A seat 52 is provided within jacket 20 above exterior frame 34 for receiving flat plug 14 within housing 24.

A locking mechanism 54 having a closure lip 56 is provided opposite living hinge 22 for additionally securing jacket 20 to annular flexible frame 18 about receiver hitch flange 36.

With reference now to FIGS. 4 and 5, protective cover 10 is thereshown in a closed position. More particularly, in FIG. 4, protective cover 10 is shown in a locked position wherein locking mechanism 54 with closure lip 56 is secured around housing 24.

FIG. 5 shows a second preferred embodiment of securing jacket 20 to housing 24 of flexible frame 18 around flange 36 of receiver hitch 12. In this preferred embodiment, a clasp-like arrangement is provided and includes a finger 58 extending from the interior end of jacket 20. A corresponding seat 60 extends below housing 24 provided along flexible frame 18. When jacket 20 is closed, finger 58 engages within seat 60 to hold protective cover 10 in place and seal opening 28 of receiver hitch 12.

Jacket 20 preferably has a flat face 62 on its exterior and provides room for indicia such as advertising or safety signs.

In another preferred embodiment, the living hinge is extended to accommodate different sized flanges 36. In this preferred embodiment, flange 36 may extend to a width of ½ inches or even 1 inch as provided by different manufacturers. To accommodate differing flange widths, living hinge 22 is elongated to allow jacket 20 to extend over flange 36 regardless of width or perimeter 50. Alternatively, living hinge 20 may be replaced with a standard hinge arrangement thereby providing two separate pieces, jacket 20 and flexible frame 18 coupled by a standard hinge.

Additionally, flexible frame 18 may be provided with housing 24 for flat plug 14 or a cable (not shown) having its own cover rather than relying on seat 52 within jacket 20 to protect the flat plug 14 or other electrical connectors, such as a cable. In this embodiment, flat plug 14 or cable may be completely removed from enclosed housing 24 when in use.

In another preferred embodiment, interior frame 32 may have an extended perimeter 46 for additionally sealing jacket 20 about perimeter 50 of receiver hitch 12. In this embodiment, interior frame 32 is elongated for extension within passageway 40 of receiver hitch 12.

In still another preferred embodiment, interior frame 32 may be completely eliminated from jacket 20 along with elimination of locking mechanism 54. Jacket 20 is then sealed about the perimeter 50 of flange 36.

Having described my invention, however, many modifications thereto will become apparent to those skilled in the art to which it pertains without any deviation from the spirit of the invention as defined by the scope of the appended claims.

I claim:

1. A cover for a vehicle hitch having a hollow beam with an exterior surface including an annular raised portion surrounding an open end thereon; comprising a preformed, flexible frame in the form of a continuous sheath having an internal surface which conforms substantially to said exterior surface of said hollow beam, enabling said flexible frame to be stretched and expanded to slide over said annular raised portion;

a hinge portion extending from said flexible frame; and a cover portion extending from said hinge portion to cover said open end of said hollow beam.

2. The cover of claim 1, wherein said flexible frame has an additional housing thereon adapted to have a plug or cable removably engaged therein.

3. The cover of claim 2, wherein said cover portion has a first end connected to said hinge portion and a second end opposite said first end, wherein a locking member extends from said second end and is adapted to engage said additional housing to secure said second end of said cover portion to said flexible frame.

4. The cover of claim 3, wherein said second end of said cover portion has a recess in which said plug or cable can be positioned.

5. The cover of claim 1, wherein said cover portion comprises an inner portion adapted to fit within said open end of said hollow beam, and an outer portion adapted to fit about the exterior of said hollow beam.

6. The cover of claim 1, wherein said cover is made from a resilient material that is flexible and stretchable.

7. The cover of claim 1, wherein said cover portion has an outer surface on which a display can be affixed.

8. The cover of claim 1, wherein said hinge portion comprises a living hinge.

9. A cover for a vehicle hitch having a hollow beam with an open end thereon, comprising:

a preformed connecting frame made of a flexible material adapted to be fitted about the exterior of said hollow beam;

a cover member coupled to said connecting frame and adapted to cover said open end of said hollow beam; and wherein said cover member has a first engaging member and said connecting frame has a second engaging member said first and second members being operative to lock said cover member and said connecting frame together.

10. The cover of claim 9, wherein said connecting frame has a plug-engaging seat thereon.

11. The cover of claim 9, wherein said cover member comprises an inner portion adapted to fit inside said open end of said hollow beam, and/or an outer portion adapted to fit about the exterior of said hollow beam.

12. The cover of claim 9, wherein a living hinge is provided to pivotally connect said connecting frame to said cover member.

13. The cover of claim 9, wherein said connecting frame is stretchable such that it can be expanded to slide over an annular raised portion of said hollow beam.

14. A cover for a vehicle hitch having a hollow beam with an open end thereon, comprising:

a connecting portion adapted to be fitted onto said hollow beam;

a cover portion coupled to said connecting portion, said cover portion being adapted to move from an open position to a closed position, and vice verse, wherein in said closed position, said cover portion covers said open end of said hollow beam;

wherein said connecting portion is adapted such that it is capable of engaging a plug or cable extending from said vehicle hitch, and a locking member extending from said cover portion; and an extension member extends from said connecting portion, said extension member and said locking member further including engaging portions which serve to lock the uncoupled ends of said cover portion and said connecting portion together.

15. The cover of claim 14, wherein said extension member has a seat into which said plug or cable can be removably inserted, and said cover portion has a recess in which said plug or cable can be positioned.

16. The cover of claim 14, wherein said connecting portion has an internal surface that has substantially the same shape as the exterior surface of said hollow beam, wherein said connecting portion is stretchable such that it can be expanded to slide over an annular raised portion on said hollow beam.

17. The cover of claim 14, wherein said cover portion comprises an inner portion adapted to fit inside said open end of said hollow beam, and an outer portion adapted to fit about the exterior of said hollow beam.

18. The cover of claim 14, wherein said cover is made from a resilient material that is flexible and stretchable.

* * * * *